Dec. 28, 1948.　　　　K. F. RUSSELL　　　　2,457,321
AIR CLEANER

Filed Jan. 4, 1945　　　　　　　　　　2 Sheets-Sheet 1

INVENTOR
KENNETH F. RUSSELL
BY
HARRIS, KIECH, FOSTER & HARRIS

FOR THE FIRM
ATTORNEYS

Dec. 28, 1948.   K. F. RUSSELL   2,457,321
AIR CLEANER
Filed Jan. 4, 1945   2 Sheets-Sheet 2
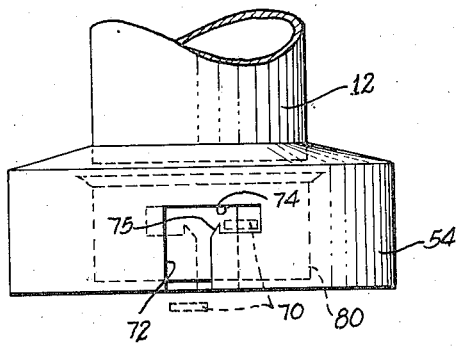
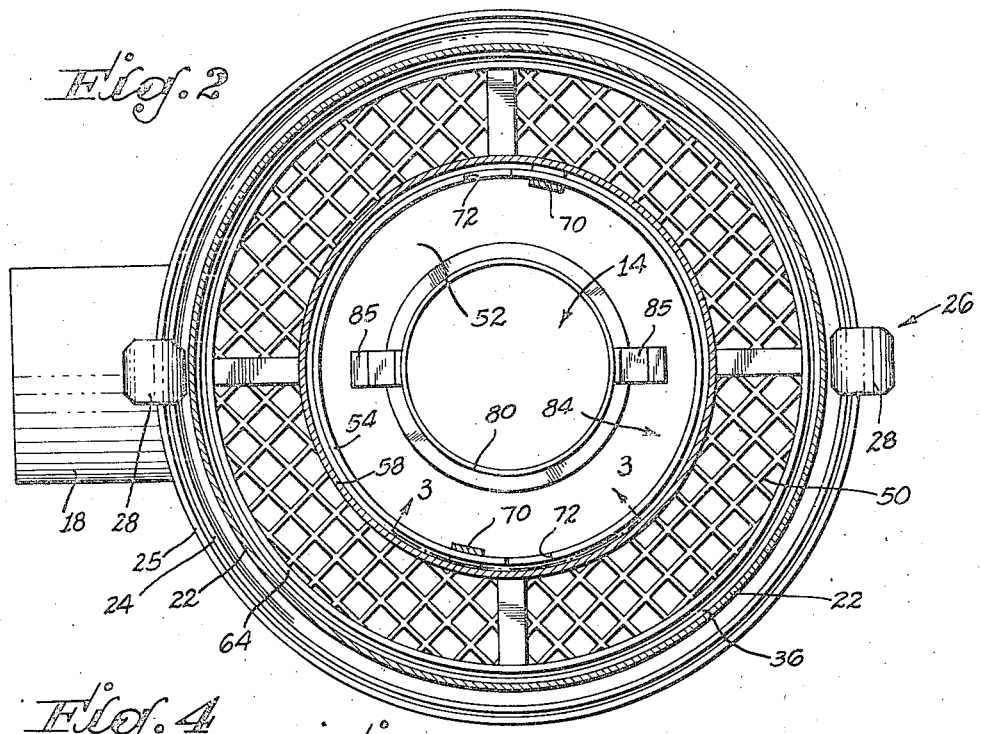
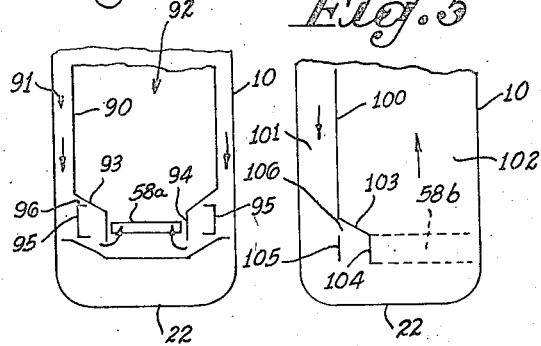
INVENTOR
KENNETH F. RUSSELL
BY
HARRIS, KIECH, FOSTER & HARRIS
FOR THE FIRM
ATTORNEYS Patented Dec. 28, 1948

2,457,321

UNITED STATES PATENT OFFICE 2,457,321

AIR CLEANER

Kenneth F. Russell, Claremont, Calif., assignor, by direct and mesne assignments, to Herman H. Garner, Claremont, Calif.

Application January 4, 1945, Serial No. 571,258

14 Claims. (Cl. 183—15)

This invention relates to air cleaners, and particularly to those of the oil-bath type which are employed, for example, upon internal combustion engines to filter and clean dust-laden air prior to its being passed to carburetors.

A particular object of this invention is to provide an air cleaner of the oil-bath type by which solid particles carried in the air stream are removed, and by means of which backfiring of the engine upon which the cleaner is used will not result in the discharge of any appreciable amount of oil out through the air feed pipe.

In air cleaners of the oil-bath type an incoming dust-laden air stream normally is conducted downward through an air passage or chamber, which in one form is a central air intake pipe or tube, and is then carried adjacent to the body of an oil-bath which is formed into a vortex by passage of air, quantities of oil being thereby picked up by the moving air, the oil-laden air stream being then passed through a filter chamber packed with appropriate filtering material which is wetted by the oil which the air stream carries. Commonly, the filter chamber is an annular chamber surrounding an air intake pipe such as above mentioned. The cleaning phenomenon in this type of structure consists in gathering of a portion of the solid particles from the air upon the first contact of the oil, the remaining solid particles being gradually removed from the air stream by reason of the contact of the air with the oil films or coatings which wet the elements of the filter pack. Solid particles collected by the oil films coating the mentioned filter pack elements are continuously washed down through the filter into the oil body which lies below the air intake pipe and the filter pack.

When an internal combustion engine backfires through an oil-bath filter of former design such as described, the rush of backfiring air and gases through the filter pack causes this rapidly moving gas stream to pick up a considerable quantity of oil from the surface of the oil body and carry it up through the air passage or chamber, such as provided by the intake pipe above described. There being no filtering element in the intake pipe, a portion of the oil is discharged from the apparatus and lost on each backfire. This is due, at least in part, to the high velocity produced by the low cross-sectional area in the air intake pipe relative to the low velocity in the filter chamber. By increasing the cross section of the lower part of the air intake passage to provide an expansion chamber adjacent the oil surface and reducing the cross section of an adjacent portion below the filter chamber to equalize these cross sections, the velocities are equalized so that the oil drops out in the enlarged chamber portion of the passage which thereby acts as an oil separator.

A specific object of this invention is, therefore, to arrange an expansion and separator chamber at the lower end of the air intake pipe, whereby to equalize the cross-sectional area adjacent the lower end of the air passage with respect to the cross-sectional area of the lower end of the filter chamber. By employing such an expansion chamber, the bulk of the oil which is moved by the influence of the backfiring gas stream tends to be thrown toward the center of the expansion chamber, with the result that the backfiring gases travel upwardly in the outer portions of the expansion chamber and against an overhanging baffle wall, whence they then pass to the air passage.

A further object of the invention is to provide means to reverse the direction of the upwardly moving backfiring air and gases as they strike the baffle wall. According to one construction, this may be accomplished by projecting the lower end of the air pipe into the expansion chamber. According to a preferred form of the invention, a short cylindrical or annular member is positioned adjacent the lower end of the intake pipe and constitutes in effect an extension thereof, this extension or a part thereof being preferably spaced a short distance from the end of the intake pipe to provide an air passage in the outer portion of the expansion chamber into the pipe. This extension thus acts in one respect as a guide or baffle for the backfiring gases moving upwardly in the outer portions of the expansion chamber.

Another object and feature of this invention is the provision, as by means of the described baffle devices, of a tortuous path for the backfiring gases, whereby to accomplish a substantially complete separation of the oil from the gas stream under backfire of ordinary intensity. Such a construction ordinarily serves immediately to stop the upward travel of the large slugs of oil that are thrown toward the center of the device by the backfire, because the gas stream has the opportunity to travel through a path other than that of the oil, any entrained oil separating from the gas stream and collecting on adjacent surfaces during its tortuous travel.

A further feature of the invention is the employment of a detachable prefilter element at the lower end of the main filter chamber and alongside the expansion chamber. This element in a preferred form also provides the lower cross-sectional area of the filter chamber which is substantially equal to the cross-sectional area of the expansion chamber.

Further objects and features of the invention will become apparent to those skilled in the art upon reference to the accompanying drawings, taken in conjunction with the following specification wherein preferred forms of the invention are disclosed for the purpose of illustration of the generic invention.

In the drawings,

Fig. 2 is a cross section, taken on the line 2—2 of Fig. 1;

Figure 1:
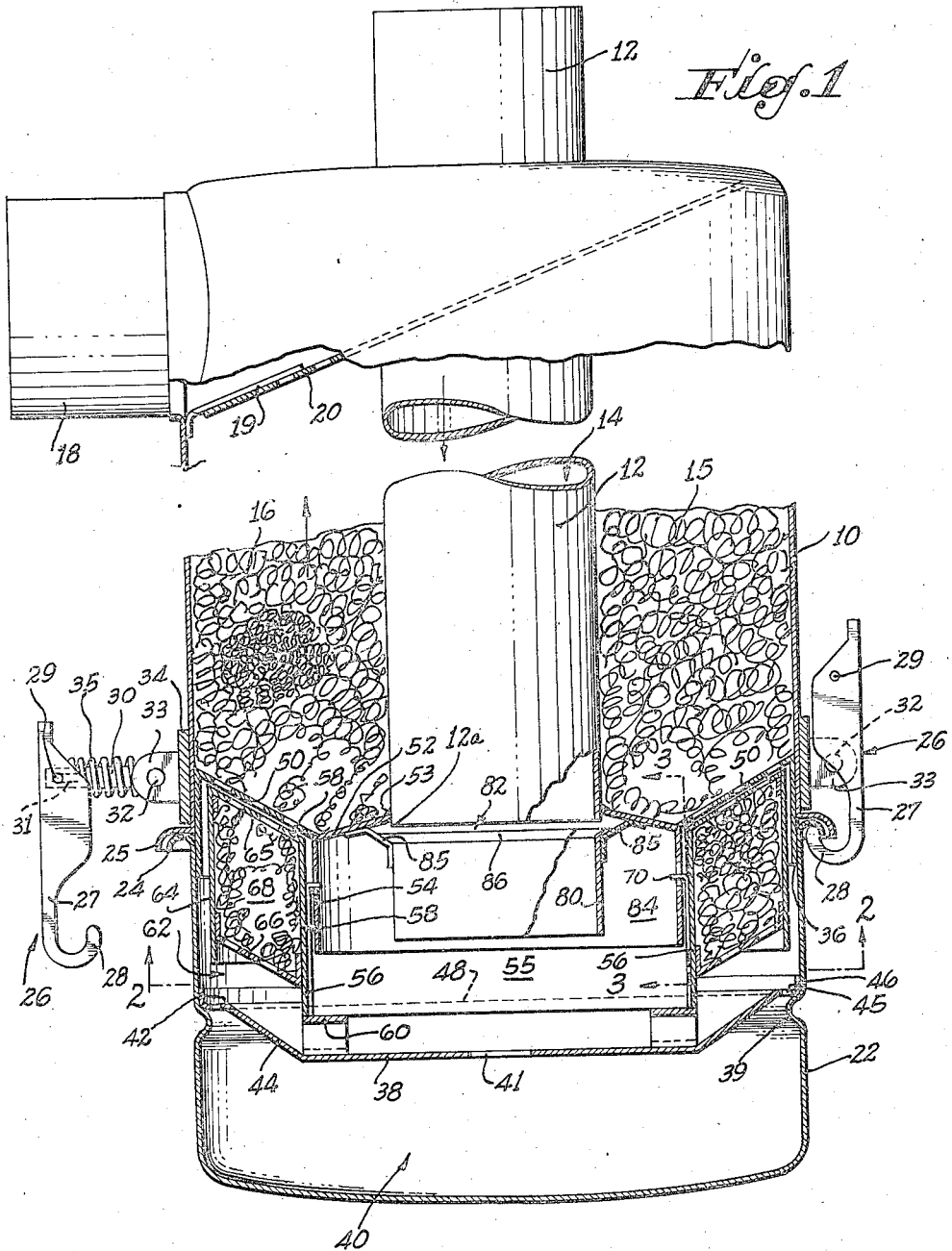
Fig. 1 is principally a vertical sectional view of an air cleaner possessing the improved features of the present invention.

Fig. 3 is an elevational detail of the depending baffle means of Figs. 1 and 2 and showing the construction provided for detachably mounting the prefilter element thereon, this view being indicated by the lines 3—3 of Figs. 1 and 2;

Fig. 4 is a diagrammatic vertical section indicating a modified application of the invention; and, Fig. 5 is a view similar to that of Fig. 4 indicating a further modified application of the invention.

In the form of the invention shown in Figs. 1, 2, and 3, an outer main casing 10 is employed within which there is centrally disposed a depending air inlet tube or intake pipe 12 which provides an air inlet passage 14. The annular space between the casing 10 and the pipe 12 provides a filter chamber 15 of relatively greater cross-sectional area as compared with that of the pipe 12, whereby the air inlet chamber or passage 14 provides for relatively high air velocity and the filter chamber 15 provides for relatively low air velocity. The filter chamber 15 is filled with a mass of any appropriate filtering material, constituting a filter pack, some of the elements of which are indicated at 16. The elements 16 of the filter pack usually are metal, and in a preferred form consist of a compressed mass of relatively short helical or spiral spring coils formed from fine guage spring wire, for example, wire of about 0.01 inch in diameter, the ends of the coils being free and open whereby their extremities are somewhat hook-shaped and definitely interlink with adjacent convolutions of other coils to provide an intertwined coherent mass. Air which has been drawn downward through the intake pipe 12 and then passed upward through the filter pack 16 is discharged from the casing 10 through any suitable outlet neck 18. In the form shown, a deflector 19 is conveniently provided above that portion of the filter pack adjacent the outlet neck 18, and the remainder of the top of the pack 16 is retained by any appropriate screen or lattice 20.

The lower end of the casing 10 carries a removable oil cup 22 which is conveniently provided at its upper edge with an overhanging annular curved lip 24 which engages the under side of a corresponding overhanging annular curved lip 25 carried on the lower edge of the casing 10, the two lips 24 and 25 being adapted to make a substantially air-tight seal with each other upon being forced into sealing position as by means of a set of appropriate clamps 26. The form of clamp shown comprises a clip 27 having a lower curved engaging jaw 28 to engage in the annular lip 24, the clip 27 carrying a transverse pivot pin 29 engaging in a shank 30, as by means of a slot 31 in the shank 30, the opposite end of the shank 30 being pivoted at 32 in ears 33 carried in a base 34 secured as by means of spot welding to the adjacent wall portion of the casing 10. A compression spring 35 is carried about the shank 30, its ends bearing against the respective pins 29 and 32. As each clamp 26 is moved from the disengaged position shown at the left of Fig. 1 into the engaged position shown at the right of Fig. 1, its spring 35 is compressed, thereby placing the parts under tension.

The oil cup 22 carries a transversely disposed aperture plate or disk 38, whose peripheral portion rests upon an inset annular bead 39. This disk 38 acts as a barrier wall which provides below it a main oil chamber 40. In order that oil may pass from the chamber 40 into the spaces above the disk 38, the latter is centrally provided with an aperture 41 and is peripherally provided with a plurality of slots 42 adjacent the outer cylindrical wall of the cup 22. In the particular form of disk 38 as shown, its body portion which depends within the oil chamber 40 is connected by means of an inclined annular portion 44 with a relatively flat annular peripheral ledge 45 which carries the slots 42 and is preferably provided with an annular flange 46. The annular edge of the ledge 45 rests upon the supporting bead 39. As a whole, the disk 38 has a saucer shape.

The location of the saucer-like disk 38 below the lower end of the air intake pipe 12 and the filter chamber 15 provides air-receiving spaces in which incoming air makes contact with the oil in the oil cup. The oil level normally lies above the body portion of the disk 38 and approximately in line with the annular ledge 45, as indicated by the broken line 48. The lower end of the filter chamber 15 is defined by an inclined annular latticework or screen 50 which positively retains the lower end of the filter pack 16, and, in the form shown, the retaining function of the screen 50 is assisted by an annular substantially horizontal or slightly inclined flange-like imperforate baffle 52 which is secured to the side of the air intake pipe 12 as by welding at 53. The location of the contact of the baffle 52 with the pipe 12 is such as to provide at least a short depending portion 12a of the pipe 12 below the baffle 52. At the periphery of the imperforate baffle 52, there is secured a depending cylindrical baffle 54 forming a partition wall, which as illustrated is concentric with the air intake pipe 12, and, as a result of its location, serves to constitute an enlarged extension of the air pipe 12 and provides a relatively enlarged chamber within its outline. The lower edge of the cylindrical baffle 54 is spaced appreciably above the barrier disk 38, and also above the normal oil level 48 so that the chamber within the cylindrical baffle 54, in conjunction with the adjacent space above the oil level 48, constitutes an expansion chamber generally indicated as 55.

The lower portion of the expansion chamber 55 is further defined by a cylindrical partition wall 56 of a prefilter member generally indicated at 58. The lower edge of the cylindrical wall 56 normally lies slightly below or approximately at the oil level 48, as illustrated, and has its position insured by engagement with a pair of diametrically disposed preferably resilient spacers 60 in the form of loops or risers which are secured as by spot welding to the adjacent body portion of the barrier disk 38. This disposition of the cylindrical wall 56 provides an annular complementary chamber 62 around the centrally disposed expansion chamber 55, and causes communication between the chambers 55 and 62 to take place within the saucer-shaped barrier disk 38 and below the lower edge of the cylindrical wall 56.

The prefilter device 58, in addition to its inner cylindrical wall 56, is provided with an outer concentric cylindrical wall 64, these being connected at their upper and lower edges by means of upper and lower screens or lattices 65 and 66, respectively. In the construction shown, the lattices 65 and 66 conform generally with the slope of the retaining screen 50, and serve to confine a second filter pack 68 which may be similar in construction to the filter pack 16. The prefilter device 58 performs the desirable function of first filtering the incoming dust-laden air before it passes to the pack 16 but after it has passed through the oil bath, and, as a result, gathers the greater proportion of dust and other solid particles not removed in its passage through the oil as it travels under the lower edge of the cylindrical partition wall 56. By reason of this function, the prefilter pack 68 becomes gradually loaded with accumulated solid particles separated from the incoming air, despite the fact that it is being continuously washed with oil that is entrained in the air stream and carried up into it and also to a certain extent into the filter pack 16. In order that the prefilter 58 may be removed for replacement or cleansing, its construction, as shown, is such that it may be readily fitted into the space 62 for normal operation and may be easily removed. In addition to its being retained in operative position against the annular retaining screen 50 by the resilient spacers 60, it is also desirably provided with means for attaching it to and suspending it from the cylindrical baffle 54. This is accomplished as by means of a pair of diametrically spaced lugs 70 secured on the inner face of its cylindrical partition wall 56. These lugs 70 are adapted to be passed upward through the lower portions 72 of bayonet slots in the cylindrical baffle 54, and then to be passed into the upper portions 74 of the bayonet slots where they are seated behind detents or retaining prongs 75. When the oil cup 22 has been removed, the prefilter 58 may be readily detached and removed merely by disengaging the lugs 70 from their seats in the upper portions 74 of the bayonet slots.

In addition to providing the expansion chamber 55 by means of the cylindrical partition wall 56 and the cylindrical baffle 54 depending below the air pipe 12, it is desirable to provide a central cylindrical auxiliary baffle 80 which is shown spaced from the lower end of the air inlet pipe 12 by a substantially annular space providing passages 82 below the lower extremity 12a of the air pipe 12. This baffle 80 lies within the chamber formed by the larger cylindrical baffle 54 and preferably terminates somewhat above the lower edge thereof. It acts to provide an annular chamber 84 within the baffle 54 and in communication with the inlet pipe 12 through the passages 82 for the purpose of providing a tortuous path for gases in the event of backfire. The auxiliary baffle 80 may be constructed and positioned in any desired manner. For example, it may be a separate length of pipe connected with the annular imperforate baffle member 52 by means of brackets 85, or the baffle 80 might be an integral extension of the pipe 12 and the passages 82 provided as louvres. In any event, the tortuous nature of the path from the chamber 84 through the passages 82 into the air pipe 12 is increased by means of an outwardly directed louvre means or overhanging annular flange 86 at the lower side of the passages 82.

In the construction thus provided, the cross-sectional area of the expansion chamber 55 is substantially equal to the cross-sectional area of the annular complementary chamber 62 which is located around the expansion chamber 55.

The generic aspects of the invention illustrated in the form of Figs. 1 to 3 may be applied in other specific constructions. Thus, other arrangements may be used where an air inlet passage or chamber of relatively smaller cross-sectional area providing high air velocity is employed in connection with a filter chamber of greater cross-sectional area providing low air velocity, there being an expansion chamber at the lower ends of said air inlet and filter chambers equalizing the cross-sectional areas below the chambers and adjacent the oil bath and serving to equalize the air velocities.

Such forms are illustrated diagrammatically in Figs. 4 and 5. In Fig. 4, the casing 10 is provided with a cylindrical filter chamber wall 90 which provides a high velocity annular air intake passage 91 outside the wall 90 and a filter chamber 92 therewithin. In order to equalize the cross-sectional areas of the spaces within the casing 10 at the lower ends of the air passage and filter chamber, the cylindrical wall 90 is provided with an inwardly directed annular shoulder 93 to which is connected a depending cylindrical baffle 94 corresponding with the cylindrical baffle 54, a suitable prefilter element 58a being located therein. By this arrangement, the cross-sectional area within the cylindrical baffle 94 is substantially equal to the cross-sectional area outside thereof. An auxiliary baffle 95, corresponding in general with the auxiliary baffle 80, is provided in substantial alignment with the cylindrical filter chamber wall 90, air passages 96 being provided to correspond with the air passages 82. Otherwise, the arrangement of the parts is substantially the same as that in Fig. 1.

In Fig. 5, a construction is indicated in which the casing 10 has a straight transverse partition 100 disposed at one side of the center of the casing 10 to provide a relatively small high velocity air inlet passage 101 and a relatively large filter chamber 102. An inclined imperforate baffle member 103 extends substantially to the center line of the casing 10 where it is connected with a depending diametrically disposed baffle wall 104. In this manner, the cross-sectional area of the space at one side of the baffle 104 below the filter chamber 102, in which a prefilter 58b is placed, is substantially the same as the cross-sectional area of the space on the other side of the baffle 104 below the air inlet 101. Here, again, an auxiliary baffle wall 105 is employed, the wall 105 paralleling the baffle wall 104 and being arranged in line with and in spaced relation below the partition 100 so as to provide a passage 106.

*Operation*

In preparing this device for normal operation, the oil cup 22 is filled with oil to bring the oil level substantially in contact with the lower edge of the cylindrical partition wall 56 of the prefilter element 58, approximately as indicated by the broken line 48.

In normal operation, incoming dust-laden air flows down at relatively high velocity through the intake pipe 12 and through the cylindrical auxiliary baffle 80 into the expansion chamber 55, the baffle 80 thus serving as an extension of the pipe 12. The air flow, which is induced by suction of the internal combustion engine upon which the device is employed, is thus caused to pass in contact with the oil body as it passes under the wall 56, whereby the air is washed by the oil and some of the solid impurities removed. Thence, the washed air with entrained oil flows up through the prefilter 58 and the main filter pack 16, the cleaned air moving around the deflector plate 19, through the screen or lattice 20 and thence to the carburetor of the engine by way of the outlet neck 18. The movement of air under the engine suction causes a vortex action in the oil body, oil being drawn upward through the central aperture 41 of the barrier disk 38, excess oil returning into the cup below the disk 38 through the peripheral slots 42. By reason of the fact that the filter pack 68 in the prefilter 58 and the main filter pack 16 are wetted with entrained oil, solid particles carried in the air stream are readily removed by contact with the resultant oil films. The amount of entrained oil, at least in the prefilter 58 and the lower portion of the filter pack 16 is sufficient to cause a washing of the filter elements and a return of the wash oil with a considerable proportion of the separated solids. The prefilter element 58, nevertheless, gradually accumulates an excess of removed solids which makes it desirable to detach and remove the same occasionally in order that it may be cleaned or replaced. This is readily accomplished by releasing the clamps 26, dropping the oil cup 22, and detaching the lugs 70 of the prefilter from the bayonet slots 72, 74.

When backfire occurs in an engine equipped with a filter of the present type, there is a tendency for the rush of the backfiring gas stream to pick up large quantities or slugs of oil and direct them outward through the air intake pipe 12. However, with the present construction, under all ordinary backfire conditions, the oil slugs are thrown to the center of the chamber 55 whereby they largely separate themselves from the gas stream and the gas stream largely moves upward through the annular chamber 84 which constitutes the outer portions of the chamber 55 and lies between the central auxiliary baffle 80 and the outer cylindrical baffle 54. The expansion chamber 55 thus acts as an oil-separating chamber. The path of travel of these gases from the annular chamber 84 is somewhat outward under the influence of the overhanging flange 86, and thence upward against the overhanging annular baffle 52, whence its direction is reversed by being directed downward by the adjacent extremity 12a of the air pipe 12 and through the annular passages 82 over the flange 86, whence its direction is again reversed as it moves upward to relieve the backfire pressure through the pipe 12. This travel of the gases through the tortuous path described and the accompanying reversals of direction serve to separate substantially all of the oil that is entrained and is not separated when the oil slugs are thrown toward the center of the expansion chamber 55.

Under ordinary conditions of backfire, substantially all of the gas travels through the annular chamber 84 and the tortuous path described, with the result that there is no oil loss. Inasmuch as the arrangement of the parts as indicated provides for a cross-sectional area of the annular chamber 62 in which the prefilter 58 is located which is substantially the same as the cross-sectional area of the expansion chamber 55, the flow of the backfire gases through the two chambers is accordingly substantially equalized, thereby reducing the velocity of gas flow in the expansion chamber 55 and restraining high velocity gas flow until the oil has separated.

In connection with the modifications indicated in Figs. 4 and 5, the same results are obtained. Thus, as the backfire gases have passed through the prefilters 58a and 58b, they are received into central chambers above the oil level whose cross-sectional areas are substantially equal to that of the chambers beyond the baffles 94 and 104. In general, after passing under the edges of the baffles 94 and 104, the gases move immediately upward by reason of having been separated from the oil slugs which are thrown against the adjacent walls of the respective oil cups 22. Thus, in these forms also, under normal backfire conditions, loss of oil through the air intake passages is prevented.

Inasmuch as various other modifications of the generic invention herein described will become apparent to those skilled in the art, it is desired to protect all such forms as come within the scope of the appended claims.

I claim as my invention:

1. In combination in an air cleaner: a vertically disposed air passage; a vertically disposed filter chamber adjacent said air passage, said filter chamber having an average cross-sectional area greater than that of said air passage; vertical baffle means disposed adjacent the lower ends of said passage and chamber and connected with the lower end of said air passage and thereby providing an effective extension of said passage in the form of an expansion chamber adjacent the lower end of said air chamber and of greater cross-sectional area than that of said passage and serving to reduce the corresponding cross-sectional area of the adjacent lower extremity of said filter chamber; and imperforate partition means adjacent the lower ends of said passage and chamber and blocking direct communication between said expansion chamber and said filter chamber and providing communication around its lower edge between said lower extremity of said filter chamber and said expansion chamber.

2. A combination according to claim 1 including a second vertical baffle means positioned within said expansion chamber and in substantial alignment with said air passage.

3. In combination in an oil-bath air cleaner: a casing; partitioning means within said casing and dividing said casing into a vertically disposed air chamber and a vertically disposed filter chamber, said filter chamber having a greater cross-sectional area than that of said air chamber; a closure for the lower end of said casing and spaced from the lower ends of said chambers, whereby to provide an oil cup; and transverse and vertical baffle means connected with the lower end of said partitioning means and dividing the lower end of said casing above said oil cup into an expansion chamber communicating with said air chamber and a fourth chamber below said filter chamber and adjacent said expansion chamber, the last two mentioned chambers being of substantially equal cross-sectional areas and communicating with each other by way of said oil cup, said baffle means blocking direct communication between said expansion chamber and said filter and fourth chambers, and the vertical baffle means having a lower edge terminating closely adjacent a normal idle oil level in said cup.

4. In combination in a liquid-bath air cleaner:

means providing an air inlet passage of relatively small cross-sectional area; means providing an air receiving chamber of relatively large cross-sectional area communicating with said inlet passage; a complementary chamber disposed adjacent and separate from said receiving chamber and having a cross-sectional area approximating that of said receiving chamber; a filter chamber of greater cross-sectional area than that of said complementary chamber and communicating with the latter; a baffle extending into said air receiving chamber in substantial alignment with the walls of said air inlet passage means, said baffle being spaced from the walls of said air inlet passage means to provide for air flow between the baffle and said air inlet passage means and a liquid cup providing the only communication between said receiving chamber and said complementary chamber and adapted to present a liquid bath to air passing therebetween, said cup providing a normal idle liquid level closely adjacent the lower boundaries of said receiving and complementary chambers.

5. In an oil-bath air cleaner, in combination: a casing; means dividing said casing into an air inlet chamber and an air filter chamber; an oil cup positioned below said chambers and adapted to pass air and gases therethrough between said chambers; oil separating means at the base of and communicating with said inlet chamber and with said oil cup and adapted under backfire conditions to separate oil from backfiring gases which pick up oil in passing to said inlet chamber and a filter medium in said filter chamber consisting of a compressed mass of short open-ended spring coils of fine gauge spring wire, the open ends of the coils being interlinked with convolutions of adjacent coils to provide an intertwined coherent mass.

6. In an air cleaner: a casing; a partition member dividing one portion of said casing into a high velocity air inlet passage and a low velocity air filter chamber of greater cross-sectional area than that of the inlet passage; means dividing another portion of said casing into chambers of approximately equal cross-sectional area respectively communicating with said inlet passage and filter chamber one of which is axially aligned with said inlet passage; means blocking communication between said filter chamber and said chamber communicating with said inlet passage; and means providing communication between said chambers of approximately equal cross-sectional areas.

7. An air cleaner, comprising in combination: a casing; tubular partition means providing a centrally disposed chamber and an annularly disposed chamber therearound, one of said chambers constituting a low velocity air filter chamber, and the other a high velocity air intake chamber; baffle means extending laterally from said partition means and beneath a portion of said filter chamber; additional baffle means spaced laterally from and extending beyond the adjacent end of said air intake chamber, thereby providing an extension of said inlet chamber of greater cross-sectional area than that of said inlet chamber and a complementary extension of said filter chamber of smaller cross-sectional area than that of said filter chamber, the cross-sectional areas of said chamber extensions approximating each other to approximately equalize air velocities therethrough, said additional baffle means having a free edge remote from said intake chamber; and closure means lying beyond said free edge and providing an air passage under said edge and connecting said chamber extensions, said baffle means separating and blocking communication between said inlet chamber extension and said filter chamber and its extension.

8. An oil-bath air cleaner comprising in combination: a casing; tubular partition means providing a central vertical chamber and an annular vertical chamber, one of which constitutes a low velocity air filter chamber and the other a high velocity air inlet passage; annular baffle means extending laterally from said partition means beneath a portion of said filter chamber; other baffle means depending from the periphery of said annular baffle means and below the adjacent end of said air inlet passage, said baffle means providing an expansion chamber communicating directly with said air inlet passage and of greater cross-sectional area than the latter, and also providing an adjacent complementary chamber of smaller cross-sectional area than that of said filter chamber, said expansion and complementary chambers tending to equalize gas velocities therethrough, said baffle means separating and blocking communication between said expansion chamber and said complementary and filter chambers, said other baffle means having a free lower edge below which communication is provided between the lower portions of said expansion chamber and said complementary chamber; and oil chamber means carried below the other chambers for providing communication between and presenting and oil-bath to said complementary and expansion chambers, the normal idle oil level in said oil chamber means being approximately at said free lower edge.

9. A combination as in claim 8, wherein the adjacent end of said tubular partition means extends below said annular baffle means to change the direction of backfire fluid striking said annular baffle.

10. A combination as in claim 8, including annular baffle means substantially aligned with and disposed below said tubular partition means and providing a passage into said tubular means between said aligned means and partition means.

11. A combination as in claim 8, including baffle means substantially aligned with and disposed below said tubular partition means and providing a passage into said tubular means between said aligned means and partition means, the adjacent end of said tubular partition means extending below said annular baffle means to change the direction of backfire fluid striking said annular baffle.

12. A combination as in claim 8, including a prefilter member disposed in said complementary chamber.

13. In combination in an oil-bath filter: a vertically disposed air inlet chamber; a vertically disposed filter chamber adjacent the air inlet chamber, the average cross-sectional area of the filter chamber exceeding that of the air inlet chamber; vertical imperforate baffle means arranged adjacent the lower ends of said chambers and reducing the cross-sectional area of the lower end of said filter chamber and providing an expansion chamber below and communicating with the lower end of the air inlet chamber, said expansion chamber having a cross-sectional area approximately equal to the cross-sectional area of the adjacent reduced lower end of the filter chamber, said baffle means having a lower edge around which communication is provided between the lower end of said expansion chamber and said reduced lower end of said filter chamber, said baffle means blocking direct communication between said expansion chamber and said filter chamber; and means providing an oil cup below said chamber, said lower edge of said baffle means being disposed approximately at the normal idle oil level in said cup.

14. An air cleaner as in claim 1 wherein the filter chamber contains a filter mass consisting of short open-ended spring coils of fine gauge spring wire, the open ends of the coils being interlinked with convolutions of adjacent coils to provide an intertwined coherent mass.

KENNETH F. RUSSELL.

REFERENCES CITED

The following references are of record in the file of this patent:

UNITED STATES PATENTS

| Number | Name | Date |
|---|---|---|
| Re. 21,272 | Hallerberg | Nov. 21, 1939 |
| 1,577,715 | Hendrickson | Mar. 23, 1926 |
| 1,828,816 | Pierson | Oct. 27, 1931 |
| 1,992,025 | Donaldson | Feb. 19, 1935 |
| 2,062,548 | Wilson | Dec. 1, 1936 |
| 2,171,752 | Kamrath | Sept. 5, 1939 |
| 2,198,963 | Garner | Apr. 30, 1940 |